United States Patent
Chen

(10) Patent No.: US 12,464,409 B2
(45) Date of Patent: Nov. 4, 2025

(54) NETWORK USING PARAMETERS PROVIDED FROM USER EQUIPMENT FOR ACCESS TRAFFIC STEERING, SWITCHING AND SPLITTING RULE SELECTION AND ASSOCIATED WIRELESS COMMUNICATION METHOD

(71) Applicant: MEDIATEK INC., Hsin-Chu (TW)

(72) Inventor: Chi-Hsien Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 395 days.

(21) Appl. No.: 18/105,222

(22) Filed: Feb. 2, 2023

(65) Prior Publication Data

US 2023/0300677 A1 Sep. 21, 2023

Related U.S. Application Data

(60) Provisional application No. 63/321,872, filed on Mar. 21, 2022.

(51) Int. Cl.
*H04W 28/08* (2023.01)

(52) U.S. Cl.
CPC ... *H04W 28/0942* (2020.05); *H04W 28/0958* (2020.05)

(58) Field of Classification Search
CPC ... H04W 80/10; H04W 76/27; H04W 28/086; H04W 8/08; H04W 28/0804; H04W 76/15; H04W 76/11; H05B 47/196; H05B 47/175; H05B 47/18; H05B 47/1975; H05B 47/1965; H05B 47/1985; G05B 15/02; H04L 12/2816; H04L 12/283; Y02B 20/40

See application file for complete search history.

(56) References Cited

U.S. PATENT DOCUMENTS

| | | | | |
|---|---|---|---|---|
| 12,250,593 | B2* | 3/2025 | Youn | H04W 24/10 |
| 2019/0373505 | A1* | 12/2019 | Jun | H04W 80/10 |
| 2021/0007166 | A1* | 1/2021 | Liao | H04W 48/16 |
| 2021/0289403 | A1* | 9/2021 | Suh | H04W 36/125 |
| 2021/0368373 | A1 | 11/2021 | Youn | |
| 2022/0124850 | A1* | 4/2022 | Gundavelli | H04L 61/103 |
| 2022/0322152 | A1* | 10/2022 | Youn | H04W 24/10 |
| 2022/0353805 | A1* | 11/2022 | Wong | H04W 28/0215 |
| 2023/0112312 | A1* | 4/2023 | Kim | H04W 36/0016 370/331 |

(Continued)

FOREIGN PATENT DOCUMENTS

| CN | 113439486 A | 9/2021 |
|---|---|---|
| CN | 113574962 A | 10/2021 |

(Continued)

*Primary Examiner* — Jung Liu

(74) *Attorney, Agent, or Firm* — Winston Hsu

(57) ABSTRACT

A network (NW) includes a wireless communication circuit and an access traffic steering, switching and splitting (ATSSS) policy decision circuit. The wireless communication circuit receives parameters from a user equipment (UE), and transmits a network-decided ATSSS policy to the UE, wherein the parameters do not include performance of a 3rd generation partnership project (3GPP) access and performance of a non-3GPP access. The ATSSS policy decision circuit performs ATSSS rule selection for generating the network-decided ATSSS policy, wherein the ATSSS rule selection is assisted by at least a portion of the parameters provided by the UE.

18 Claims, 8 Drawing Sheets

(56) References Cited

U.S. PATENT DOCUMENTS

| | | |
|---|---|---|
| 2023/0217310 A1* | 7/2023 | Zhang .................. H04W 40/18 370/252 |
| 2024/0389178 A1* | 11/2024 | Zia ...................... H04W 40/026 |
| 2024/0406989 A1* | 12/2024 | Gordaychik ........ H04W 72/542 |
| 2025/0008376 A1* | 1/2025 | Kim ...................... H04W 28/08 |
| 2025/0024400 A1* | 1/2025 | Youn ..................... H04W 76/12 |
| 2025/0048068 A1* | 2/2025 | Ly .......................... H04W 4/60 |
| 2025/0071034 A1* | 2/2025 | Wang ..................... H04L 41/16 |
| 2025/0126033 A1* | 4/2025 | Kim ..................... H04W 76/25 |

FOREIGN PATENT DOCUMENTS

| | | |
|---|---|---|
| WO | 2021/155090 A1 | 8/2021 |
| WO | 2021/203794 A1 | 10/2021 |
| WO | 2022/026482 A1 | 2/2022 |
| WO | 2022/050659 A1 | 3/2022 |

* cited by examiner

NETWORK USING PARAMETERS PROVIDED FROM USER EQUIPMENT FOR ACCESS TRAFFIC STEERING, SWITCHING AND SPLITTING RULE SELECTION AND ASSOCIATED WIRELESS COMMUNICATION METHOD

CROSS REFERENCE TO RELATED APPLICATIONS

This application claims the benefit of U.S. Provisional Application No. 63/321,872, filed on Mar. 21, 2022. The content of the application is incorporated herein by reference.

BACKGROUND

The present invention relates to wireless communications, and more particularly, to a network (NW) that uses parameters (e.g., assist parameters or neural network parameters) provided from a user equipment (UE) for access traffic steering, switching and splitting (ATSSS) rule selection and an associated wireless communication method.

Access traffic steering, switching and splitting (ATSSS) is standardized for enabling traffic steering across multiple accesses, including a $3^{rd}$ generation partnership project (3GPP) access (e.g., fifth generation (5G) cellular network) and a non-3GPP access (e.g., WiFi network). Specifically, an ATSSS capable UE can use the ATSSS functionality to steer, switch and split the traffic across the 3GPP access and the non-3GPP access. Steering on the 3GPP access and the non-3GPP access can select one of the 3GPP access and the non-3GPP access for best access network selection. Switching on the 3GPP access and the non-3GPP access can switch the 3GPP access to/from the non-3GPP access network for seamless handover. The splitting on the 3GPP access and the non-3GPP access can select both of the 3GPP access and the non-3GPP access for access network aggregation.

The ATSSS capable UE can perform access performance measurements to decide how to distribute traffic over 3GPP access and non-3GPP access. In addition, the performance measurement function (PMF) needs to report measurement result (availability and round-trip time) to the network (NW), and then the NW may refer to performance measurement results of 3GPP access and non-3GPP access to determine and transmit ATSSS rules to the UE. In accordance with the current ATSSS specification, there is no way for UE to provide parameters to assist NW for ATSSS rule selection. Hence, NW can only determine the ATSSS rules based on measurement reports of current network environments of 3GPP access and non-3GPP access. In addition, the NW-side ATSSS rule selection has a lack of UE's point of view.

SUMMARY

One of the objectives of the claimed invention is to provide a network (NW) that uses parameters (e.g., assist parameters or neural network parameters) provided from a user equipment (UE) for access traffic steering, switching and splitting (ATSSS) rule selection and an associated wireless communication method.

According to a first aspect of the present invention, an exemplary network (NW) is disclosed. The exemplary NW includes a wireless communication circuit and an access traffic steering, switching and splitting (ATSSS) policy decision circuit. The wireless communication circuit is arranged to receive parameters from a user equipment (UE) and transmit a network-decided ATSSS policy to the UE, wherein the parameters do not include performance of a 3rd generation partnership project (3GPP) access and performance of a non-3GPP access. The ATSSS policy decision circuit is arranged to perform ATSSS rule selection for generating the network-decided ATSSS policy, wherein the ATSSS rule selection is assisted by at least a portion of the parameters provided by the UE.

According to a second aspect of the present invention, an exemplary network (NW) is disclosed. The exemplary NW includes a wireless communication circuit, an access performance prediction circuit, and an access traffic steering, switching and splitting (ATSSS) policy decision circuit. The wireless communication circuit is arranged to receive parameters from a user equipment (UE) and transmit a network-decided ATSSS policy to the UE. The access performance prediction circuit is arranged to perform access performance prediction to obtain predicted performance of the 3GPP access and predicted performance of the non-3GPP access, wherein the access performance prediction is assisted by at least a portion of the parameters. The ATSSS policy decision circuit is arranged to generate the network-decided ATSSS policy according to the predicted performance of the 3GPP access and the predicted performance of the non-3GPP access.

According to a third aspect of the present invention, an exemplary wireless communication method applicable to a network (NW) is disclosed. The exemplary wireless communication method includes: receiving parameters transmitted from a user equipment (UE), wherein the parameters do not include performance of a 3rd generation partnership project (3GPP) access and performance of a non-3GPP access; performing access traffic steering, switching and splitting (ATSSS) rule selection for generating a network-decided ATSSS policy, wherein the ATSSS rule selection is assisted by at least a portion of the parameters provided by the UE; and transmitting the network-decided ATSSS policy to the UE.

According to a fourth aspect of the present invention, an exemplary wireless communication method applicable to a network (NW) is disclosed. The exemplary wireless communication method includes: receiving parameters transmitted from a user equipment (UE); performing access performance prediction to obtain predicted performance of the 3GPP access and predicted performance of the non-3GPP access, wherein the access performance prediction is assisted by at least a portion of the parameters; generating a network-decided access traffic steering, switching and splitting (ATSSS) policy according to the predicted performance of the 3GPP access and the predicted performance of the non-3GPP access; and transmitting the network-decided ATSSS policy to the UE.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
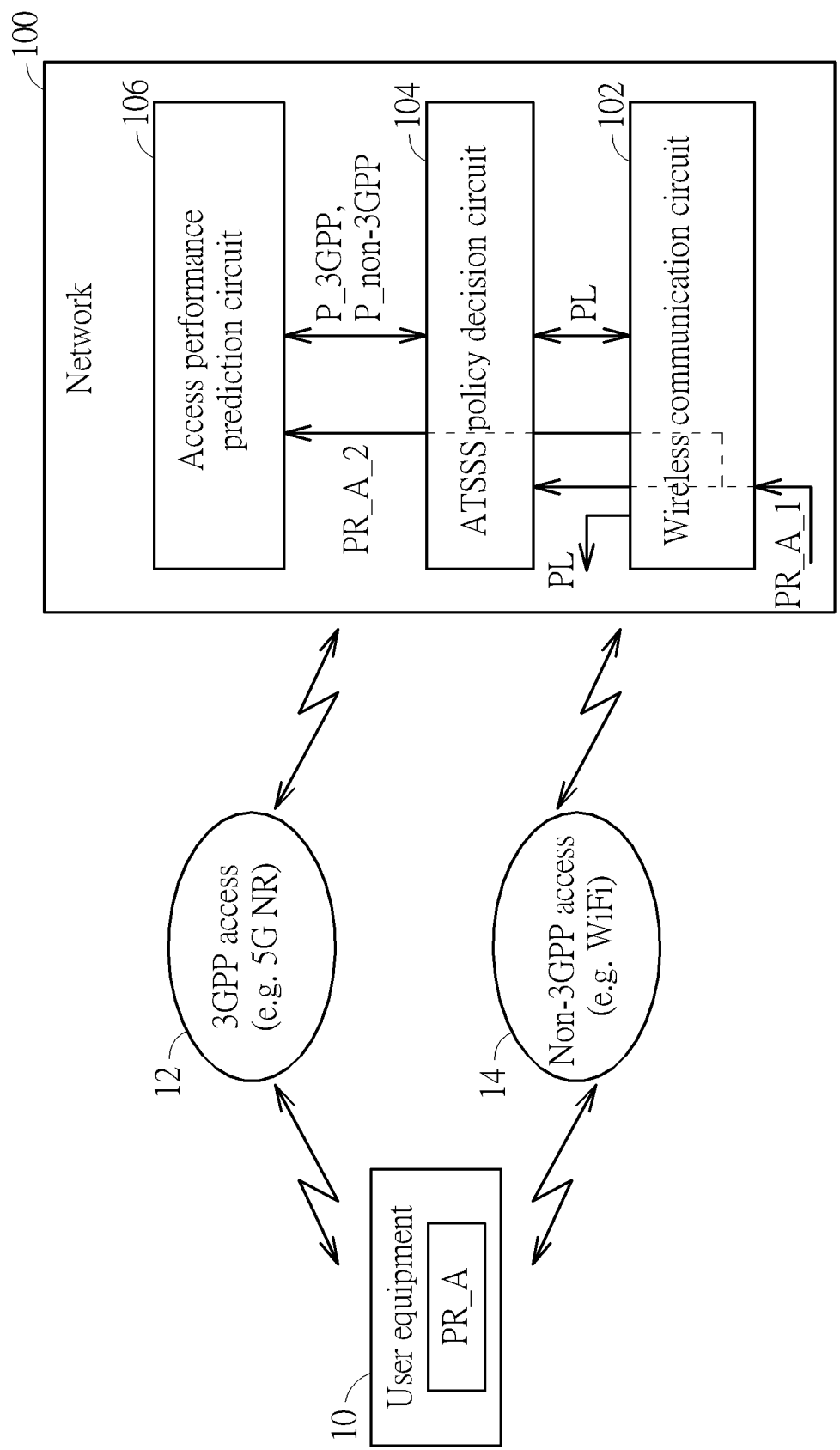
FIG. 1 is a diagram illustrating a first NW design using UE-assisted parameters according to an embodiment of the present invention.

FIG. 1 is a diagram illustrating a first NW design using UE-assisted parameters according to an embodiment of the present invention. By way of example, but not limitation, a network (NW) 100 may be a 5G core network, and a user equipment (UE) 10 may be a 5G system (5GS) ATSSS capable UE that supports ATSSS functionalities for dealing with traffic steering across multiple accesses, including a 3rd generation partnership project (3GPP) access (e.g., 5G New Radio) 12 and a non-3GPP access (e.g., WiFi) 14. The NW 100 may configure a network-decided ATSSS policy PL (which includes ATSSS rules for steering modes such as an Active-Standby mode, a Smallest Delay mode, a Load-balancing mode, and a Priority-based mode) and push it to the UE 10. The UE 10 may take action (steer, switch, split) under a steering mode (which is one of the Active-Standby mode, the Smallest Delay mode, the Load-Balancing mode, and the Priority-based mode) if a condition of the UE 10 fulfills one of the ATSSS rules provided from the NW 100. In this embodiment, the NW 100 includes a wireless communication circuit 102, an ATSSS policy decision circuit 104, and an access performance prediction circuit 106. It should be noted that only the components pertinent to the present invention are shown in FIG. 1. In practice, the NW 100 is allowed to have other components to achieve other designated functions.

The wireless communication circuit 102 is arranged to receive assist parameters PR_A from the UE, and transmit the network-decided ATSSS policy PL to the UE 10. In some embodiments, the UE 10 may perform access performance measurement upon the 3GPP access 12 and the non-3GPP access 14 for measuring performance of the 3GPP access 12 and performance of the non-3GPP access 14, where the measured performance of the 3GPP access 12 is an instant measurement result of a current network environment of the 3GPP access 12, and the measured performance of the non-3GPP access 14 is an instant measurement result of a current network environment of the non-3GPP access 14. In some embodiments, the UE 10 may perform access performance prediction upon the 3GPP access 12 and the non-3GPP access 14 for predicting performance of the 3GPP access 12 and performance of the non-3GPP access 14, where the predicted performance of the 3GPP access 12 is a predicted measurement result of a future network environment of the 3GPP access 12, and the predicted performance of the non-3GPP access 14 is a predicted measurement result of a future network environment of the non-3GPP access 14. It should be noted that the assist parameters PR_A provided by the UE 10 and transmitted to the NW 100 do not include measured/predicted performance of the 3GPP access 12 and measured/predicted performance of the non-3GPP access 14. In other words, the assist parameters PR_A provide extra information that can assist the NW 100 on decision of the network-decided ATSSS policy PL.

The access performance prediction circuit 106 is arranged to perform access performance prediction to obtain predicted performance P_3GPP of the 3GPP access 12 and predicted performance P_non-3GPP of the non-3GPP access 14. Compared to measured performance which is an instant measurement result of a current network environment of the 3GPP access 12, the predicted performance P_3GPP is a predicted measurement result of a further network environment of the 3GPP access 12. Compared to measured performance which is an instant measurement result of a current network environment of the non-3GPP access 14, the predicted performance P_non-3GPP is a predicted measurement result of a further network environment of the non-3GPP access 14.

The ATSSS policy decision circuit 104 is arranged to perform ATSSS rule selection for generating the network-decided ATSSS policy PL (which include ATSSS rules for steering modes such as the Active-Standby mode, the Smallest Delay mode, the Load-Balancing mode, and the Priority-based mode). The predicted performance P_3GPP of the 3GPPP access 12 and the predicted performance P_non-3GPP of the non-3GPP access 14 are referenced by the ATSSS rule selection at the ATSSS policy decision circuit 104. The network environments of the 3GPP access 12 and the non-3GPP access 14 change rapidly. Since the network-decided ATSSS policy PL is determined on the basis of the predicted performance P_3GGP of the 3GPP access 12 and the predicted performance P_non-3GPP of the non-3GPP access 14 (i.e., knowledge of future measurement results of the 3GPP access 12 and the non-3GPP access 14 provided from access performance prediction), the NW 100 (particularly, ATSSS policy decision circuit 104 of NW 100) can select proper ATSSS rules in advance, thereby improving the end-user experience at the UE 10 greatly.

In this embodiment, assist parameters PR_A are communicated between UE 10 and NW 100. The ATSSS rule selection at the ATSSS policy decision circuit 104 is assisted by parameters PR_A_1 included in the assist parameters PR_A provided by the UE 10. Since the ATSSS policy decision circuit 104 can select ATSSS rules taking account of auxiliary information from UE's point of view, the ATSSS policy decision circuit 104 can provide better ATSSS rule selection when deciding the network-decided ATSSS policy PL that will be sent to the UE 10. In addition, the access performance prediction at the access performance prediction circuit 106 is assisted by parameters PR_A_2 included in the assist parameters PR_A, where parameters PR_A_1 may be the same or different from the parameters PR_A_2. Since the access performance prediction circuit 106 can obtain predicted measurement results taking account of auxiliary information from UE's point of view, the access performance prediction circuit 106 can provide better performance prediction when deciding the predicted performance P_3GPP and P_non-3GPP that will be referenced by ATSSS policy selection.

In the embodiment shown in FIG. 1, the NW 100 uses assist parameters PRA (which may consist of parameters PR_A_1 and parameters PR_A_2) provided by UE 10 to assist both of the access performance prediction and ATSSS rule selection. However, this is for illustrative purposes only, and is not meant to be a limitation of the present invention. In practice, any network using assist parameters provided by a user equipment to assist one of access performance prediction and ATSSS rule selection still falls within the scope of the present invention.

Figure 2:
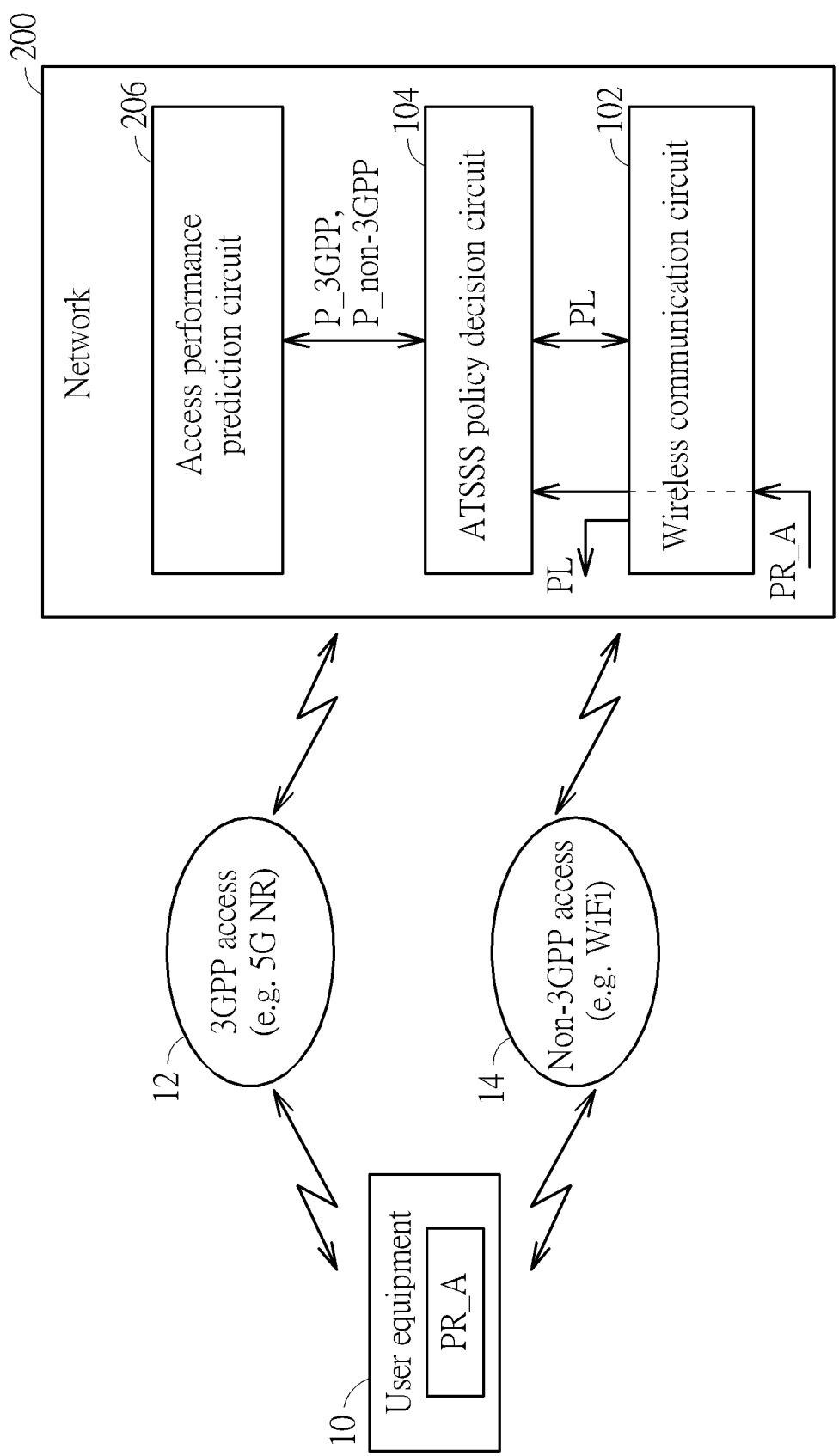
FIG. 2 is a diagram illustrating a second NW design using UE-assisted parameters according to an embodiment of the present invention.

FIG. 2 is a diagram illustrating a second NW design using UE-assisted parameters according to an embodiment of the present invention. By way of example, but not limitation, a network (NW) 200 may be a 5G core network, and the UE 10 may be a 5GS ATSSS capable UE that supports ATSSS functionalities for dealing with traffic steering across multiple accesses, including 3GPP access 12 and non-3GPP access 14. The NW 200 may be built through applying modifications to the NW 100. The major difference between the NW 100 and the NW 200 is that the NW 200 uses parameters included in the assist parameters PR_A provided from the UE 10 to assist ATSSS rule selection at the ATSSS policy decision circuit 104, and access performance prediction at an access performance prediction circuit 206 is not necessarily assisted by parameters included in the assist parameters PR_A. Since a person skilled in the art can readily understand details of the UE-assisted ATSSS rule selection after reading above paragraphs directed to the embodiment shown in FIG. 1, further description is omitted here for brevity.

Figure 3:
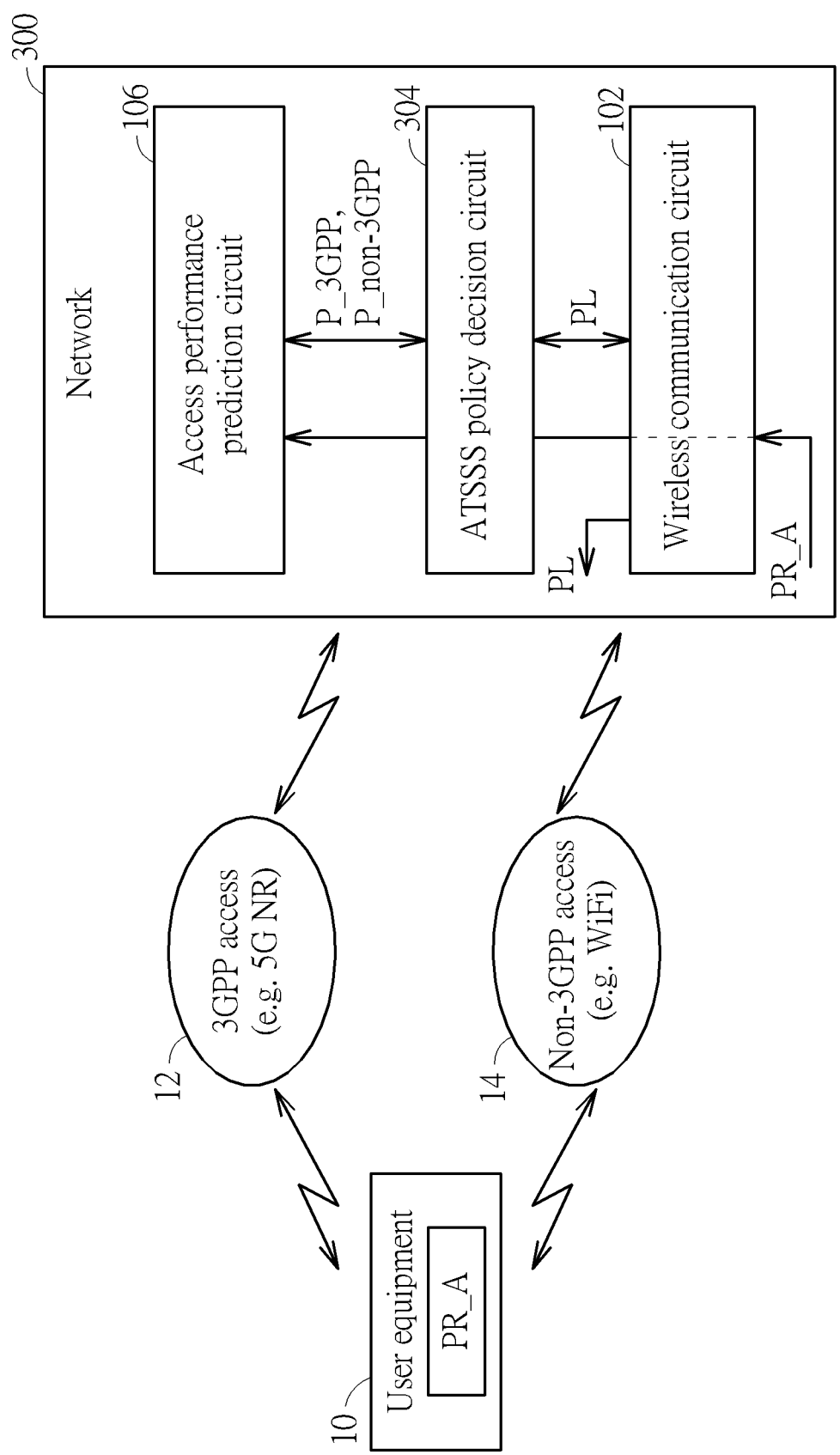
FIG. 3 is a diagram illustrating a third NW design using UE-assisted parameters according to an embodiment of the present invention.

FIG. 3 is a diagram illustrating a third NW design using UE-assisted parameters according to an embodiment of the present invention. By way of example, but not limitation, a network (NW) 300 may be a 5G core network, and the UE 10 may be a 5GS ATSSS capable UE that supports ATSSS functionalities for dealing with traffic steering across multiple accesses, including 3GPP access 12 and non-3GPP access 14. The NW 300 may be built through applying modifications to the NW 100. The major difference between the NW 100 and the NW 300 is that the NW 300 uses parameters included in the assist parameters PR_A provided from the UE 10 to assist access performance prediction at the access performance prediction circuit 106, and ATSSS rule selection at an ATSSS policy decision circuit 304 is not necessarily assisted by parameters included in the assist parameters PR_A. Since a person skilled in the art can readily understand details of the UE-assisted access performance prediction after reading above paragraphs directed to the embodiment shown in FIG. 1, further description is omitted here for brevity.

Figure 4:
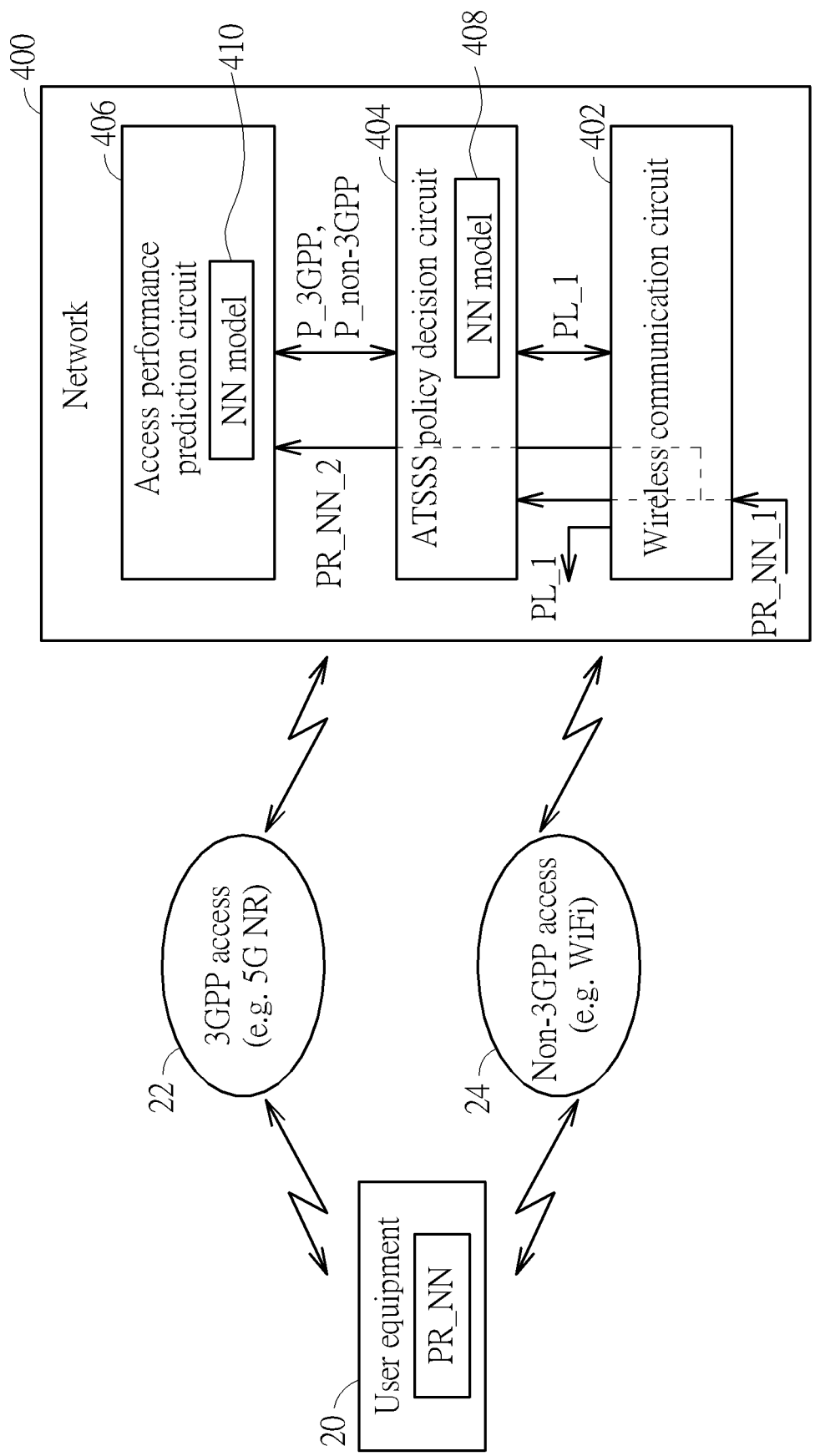
FIG. 4 is a diagram illustrating a fourth NW design using UE-assisted parameters according to an embodiment of the present invention.

FIG. 4 is a diagram illustrating a fourth NW design using UE-assisted parameters according to an embodiment of the present invention. By way of example, but not limitation, a network (NW) 400 may be a 5G core network, and a user equipment 20 may be a 5GS ATSSS capable UE that supports ATSSS functionalities for dealing with traffic steering across multiple accesses, including a 3GPP access (e.g., 5G NR) 22 and a non-3GPP access (e.g., WiFi) 24. The NW 400 may configure a network-decided ATSSS policy PL_1 (which includes ATSSS rules for steering modes such as an Active-Standby mode, a Smallest Delay mode, a Load-balancing mode, and a Priority-based mode) and push it to the UE 20. The UE 20 may take action (steer, switch, split) under a steering mode (which is one of the Active-Standby mode, the Smallest Delay mode, the Load-Balancing mode, and the Priority-based mode) if a condition of the UE 20 fulfills one of the ATSSS rules provided from the NW 400. In this embodiment, the NW 400 includes a wireless communication circuit 402, an ATSSS policy decision circuit 404, and an access performance prediction circuit 406. It should be noted that only the components pertinent to the present invention are shown in FIG. 4. In practice, the NW 400 is allowed to have other components to achieve other designated functions.

The wireless communication circuit 402 is arranged to receive neural network (NN) parameters PR_NN from the UE 20, and transmit the network-decided ATSSS policy PL_1 to the UE 20.

The access performance prediction circuit 406 is arranged to perform access performance prediction to obtain predicted performance P_3GPP of the 3GPP access 22 and predicted performance P_non-3GPP of the non-3GPP access 24. Compared to measured performance which is an instant measurement result of a current network environment of the 3GPP access 22, the predicted performance P_3GPP is a predicted measurement result of a further network environment of the 3GPP access 22. Compared to measured performance which is an instant measurement result of a current network environment of the non-3GPP access 24, the predicted performance P_non-3GPP is a predicted measurement result of a further network environment of the non-3GPP access 24.

The access performance prediction circuit 406 is arranged to perform access performance prediction through machine learning. In this embodiment, the NW 400 performs NN-based 3GPP and non-3GPP access performance prediction to obtain the predicted performance P_3GPP of the 3GPP access 22 and the predicted performance P_non-3GPP of the non-3GPP access 24 that can be later referenced for ATSSS rule selection. The access performance prediction circuit 406 may be implemented by pure hardware, or a processor that loads and executes program codes, or a combination thereof. That is, the NW-side machine-learning-based access performance prediction may be achieved through hardware-based means, software-based means, or a combination thereof.

The NN model employed by the UE 400 is defined by NN parameters (e.g., weights). Specifically, the NN parameters PR_NN may be provided by the UE 20 to assist the NW 400 on the NN-based access performance prediction. In this way, better access performance prediction can be achieved by parameters included in the NN parameters PR_NN communicated between UE 400 and NW 20. Hence, the access performance prediction circuit 406 is further arranged to use an NN model 410 indicated by parameters PR_NN_2 included in the NN parameters PR_NN to obtain the predicted performance P_3GPP of the 3GPP access 22 and the predicted performance P_non-3GPP of the non-3GPP access 24.

The ATSSS policy decision circuit 404 is arranged to perform ATSSS rule selection for generating the network-decided ATSSS policy PL_1 (which include ATSSS rules for steering modes such as the Active-Standby mode, the Smallest Delay mode, the Load-Balancing mode, and the Priority-based mode). The predicted performance P_3GPP of the 3GPPP access 12 and the predicted performance P_non-3GPP of the non-3GPP access 14 are referenced by the ATSSS rule selection at the ATSSS policy decision circuit 404. The network environments of the 3GPP access 22 and the non-3GPP access 24 change rapidly. Since the network-decided ATSSS policy PL_1 is determined on the basis of the predicted performance P_3GGP of the 3GPP access 22 and the predicted performance P_non-3GPP of the non-3GPP access 24 (i.e., knowledge of future measurement results of the 3GPP access 22 and the non-3GPP access 24 provided from access performance prediction), the NW 400 (particularly, ATSSS policy decision circuit 404 of NW 400) can select proper ATSSS rules in advance, thereby improving the end-user experience at the UE 20 greatly.

The ATSSS policy decision circuit 404 is arranged to determine the non-network-decided ATSSS policy PL_1 through machine learning. In this embodiment, the NW 400 performs NN-based ATSSS policy selection to obtain the network-decided ATSSS policy PL_1. Each NN model employed by the NW 400 is defined by NN parameters (e.g., weights). For example, the NN parameters PR_NN may be provided by the UE 20 to assist the NW 400 on the NN-based ATSSS policy selection. In this way, better ATSSS rule selection can be achieved by the NN parameters PR_NN communicated between UE 400 and NW 20. Hence, the ATSSS policy decision circuit 404 is further arranged to use an NN model 408 indicated by parameters PR_NN_1 included in the NN parameters PR_NN to determine the network-decided ATSSS policy PL_1.

In the embodiment shown in FIG. 4, the NW 400 uses NN parameters PR_NN (which may consist of parameters PR_NN_1 and parameters PR_NN_2) provided by UE 20 to assist both of machine-learning-based access performance prediction and machine-learning-based ATSSS rule selection. However, this is for illustrative purposes only, and is not meant to be a limitation of the present invention. In practice, any network using NN parameters provided by a user equipment to assist one of machine-learning-based access performance prediction and machine-learning-based ATSSS rule selection still falls within the scope of the present invention.

Figure 5:
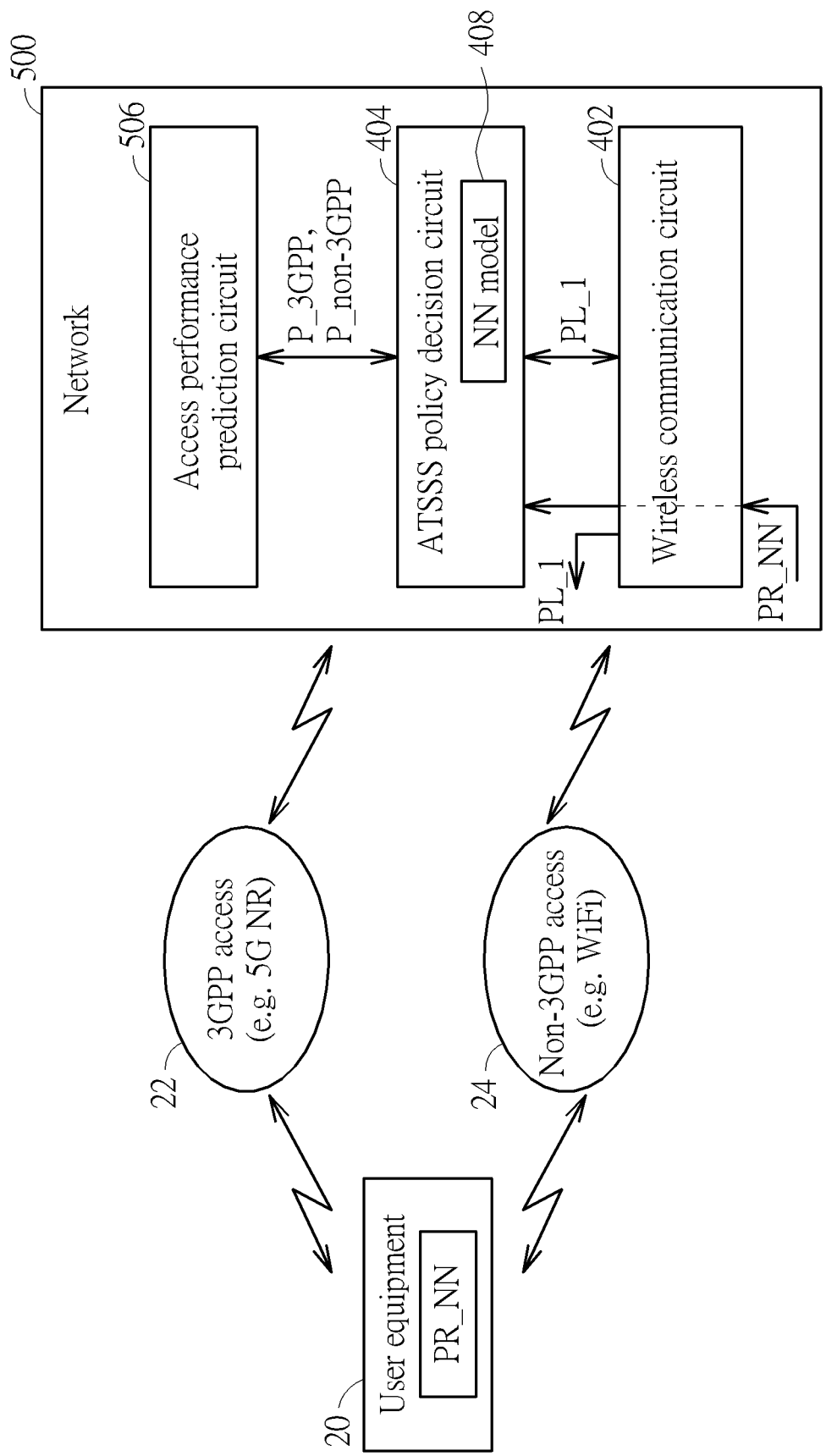
FIG. 5 is a diagram illustrating a fifth NW design using UE-assisted parameters according to an embodiment of the present invention.

FIG. 5 is a diagram illustrating a fifth NW design using UE-assisted parameters according to an embodiment of the present invention. By way of example, but not limitation, a network (NW) 500 may be a 5G core network, and the UE 20 may be a 5GS ATSSS capable UE that supports ATSSS functionalities for dealing with traffic steering across multiple accesses, including 3GPP access 22 and non-3GPP access 24. The NW 500 may be built through applying modifications to the NW 400. The major difference between the NW 400 and the NW 500 is that the NW 500 uses parameters included in the NN parameters PR_NN provided from the UE 20 to assist ATSSS rule selection at the ATSSS policy decision circuit 404, and access performance prediction at an access performance prediction circuit 506 is not necessarily assisted by parameters included in the NN parameters PR_NN. Since a person skilled in the art can readily understand details of the UE-assisted machine-learning-based ATSSS rule selection after reading above paragraphs directed to the embodiment shown in FIG. 4, further description is omitted here for brevity.

Figure 6:
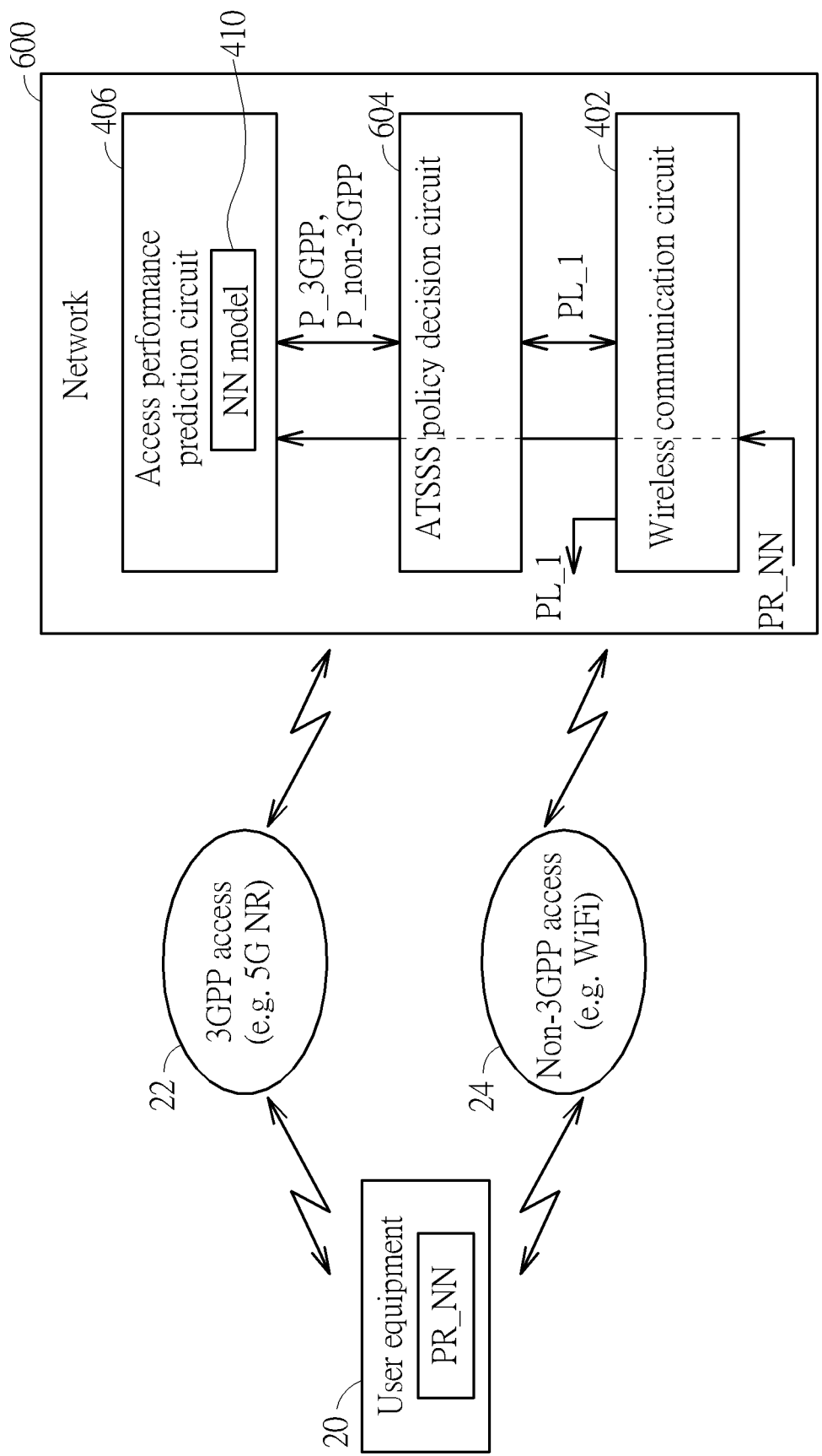
FIG. 6 is a diagram illustrating a sixth NW design using UE-assisted parameters according to an embodiment of the present invention.

FIG. 6 is a diagram illustrating a sixth NW design using UE-assisted parameters according to an embodiment of the present invention. By way of example, but not limitation, a network (NW) 600 may be a 5G core network, and the UE 20 may be a 5GS ATSSS capable UE that supports ATSSS functionalities for dealing with traffic steering across multiple accesses, including 3GPP access 22 and non-3GPP access 24. The NW 600 may be built through applying modifications to the NW 400. The major difference between the NW 400 and the NW 600 is that the NW 600 uses parameters included in the NN parameters PR_NN provided from the UE 20 to assist access performance prediction at the access performance prediction circuit 406, and ATSSS rule selection at an ATSSS policy decision circuit 604 is not necessarily assisted by parameters included in the NN parameters PR_NN. Since a person skilled in the art can readily understand details of the UE-assisted machine-learning-based access performance prediction after reading above paragraphs directed to the embodiment shown in FIG. 4, further description is omitted here for brevity.

Figure 7:
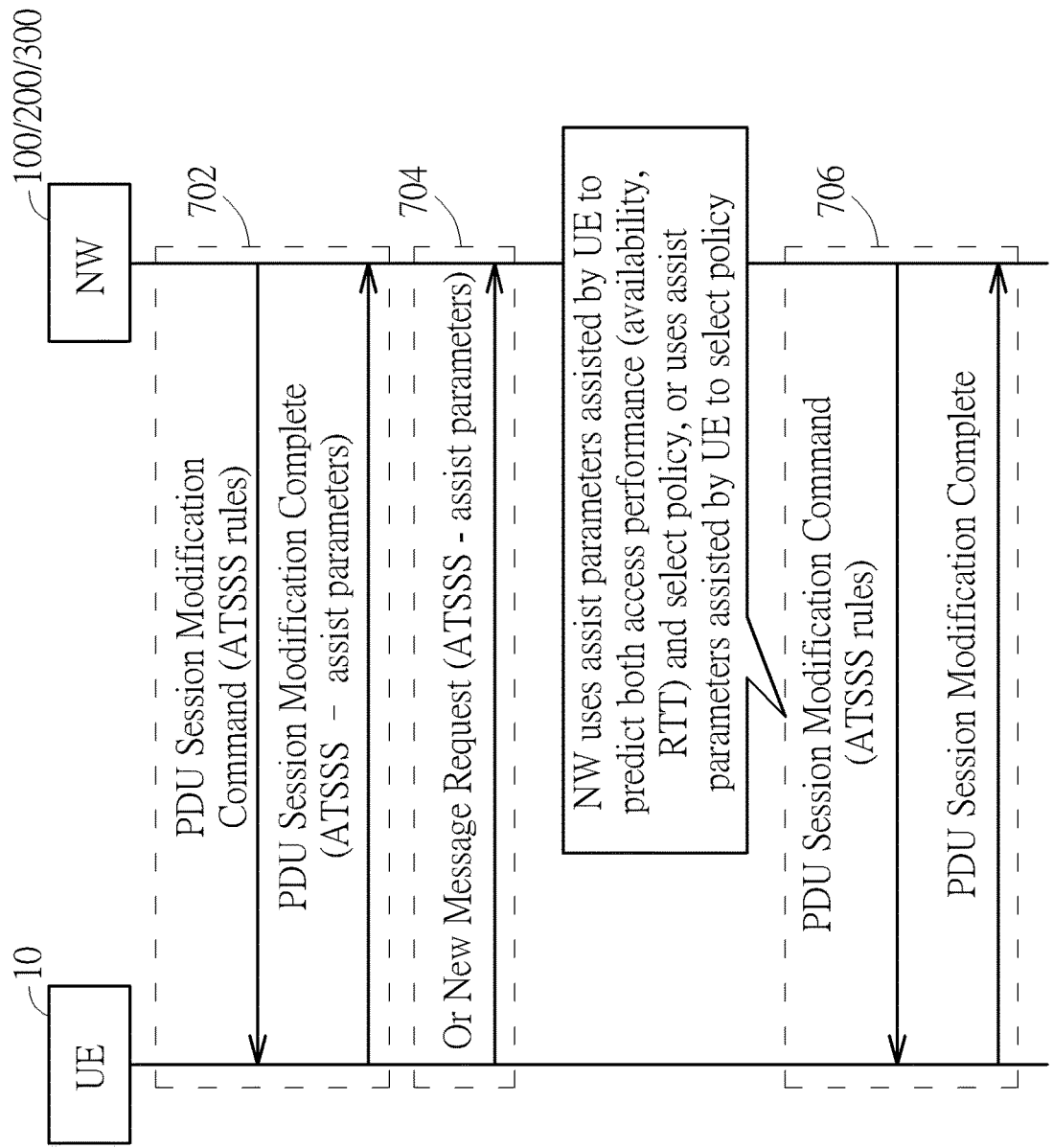
FIG. 7 is a first sequence diagram illustrating interactions between UE and NW according to an embodiment of the present invention.

FIG. 7 is a first sequence diagram illustrating interactions between the UE 10 and the NW 100/200/300 according to an embodiment of the present invention. The NW 100/200/300 may initiate a protocol data unit (PDU) session modification procedure 702 by sending a PDU Session Modification Command message to the UE 10. The ATSSS rules provided by the NW 100/200/300 are carried in the PDU Session Modification Command message. The UE 10 acknowledges the PDU Session Modification Command message, and sends a PDU Session Modification Complete message to the NW 100/200/300. In this embodiment, the assist parameters PR_A provided by the UE 10 are carried in the PDU Session Modification Complete message. Alternatively, the UE 10 may initiate a new PDU session procedure 704 for sending the assist parameters PR_A to the NW 100/200/300 via a new Message Request.

After receiving the assist parameters PR_A, the NW 100/200/300 uses the assist parameters PR_A assisted by the UE 10 to perform access performance prediction and ATSSS rule selection (or uses the assist parameters PR_A assisted by the UE 10 to perform ATSSS rule selection), thereby generating the network-decided ATSSS policy PL. The NW 100/200/300 may initiate a PDU session modification procedure 706 by sending a PDU Session Modification Command message to the UE 10. The ATSSS rules provided by the NW 100/200/300 assisted by the UE-provided assist parameters PR_A are carried in the PDU Session Modification Command message. Specifically, the PDU Session Modification Command message carries the network-decided ATSSS policy PL, including ATSSS rules for steering modes such as the Active-Standby mode, the Smallest Delay mode, the Load-Balancing mode, and the Priority-based mode. The UE 10 acknowledges the PDU Session Modification Command message, and sends a PDU Session Modification Complete message to the NW 100/200/300.

Figure 8:
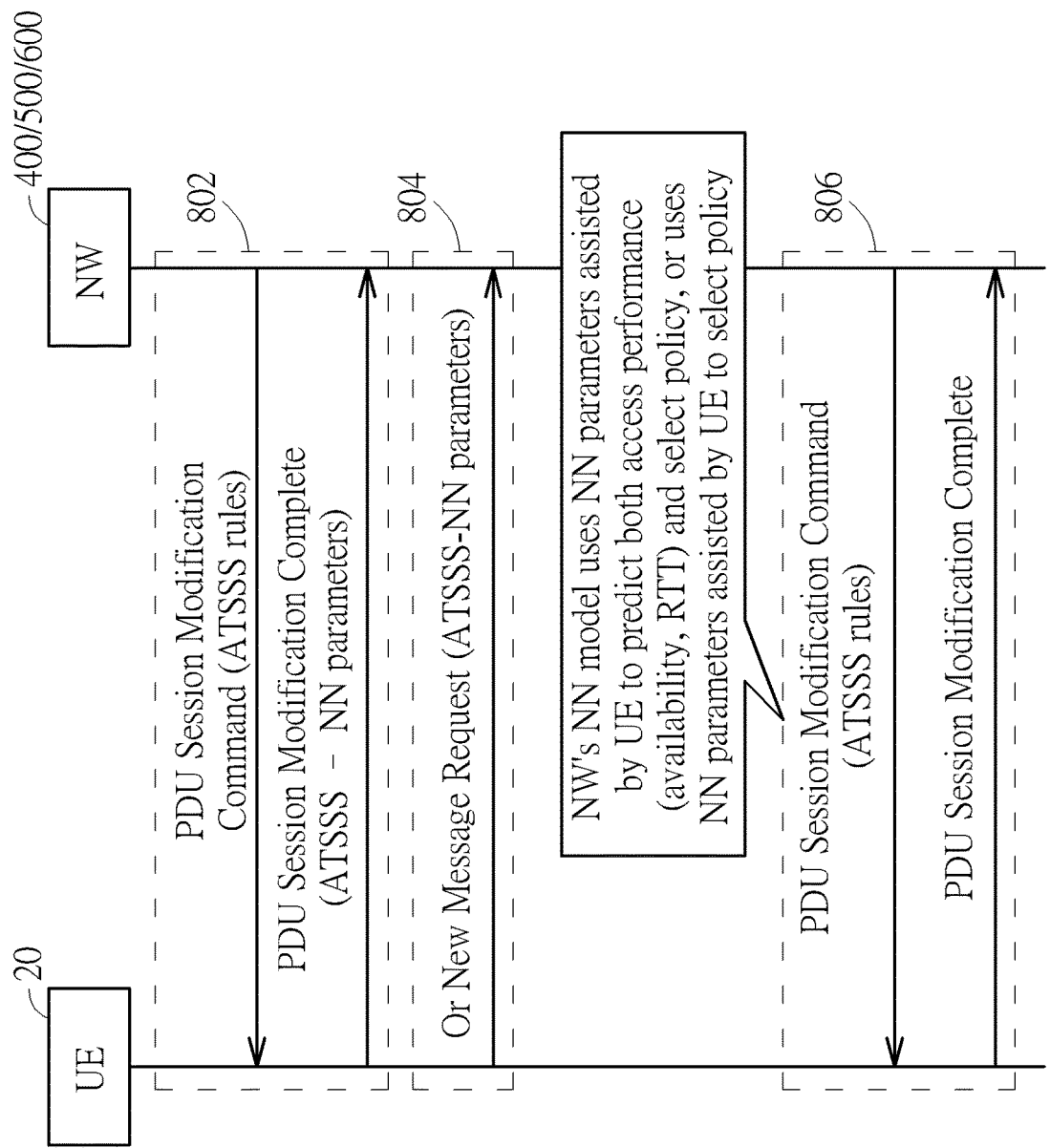
FIG. 8 is a second sequence diagram illustrating interactions between UE and NW according to an embodiment of the present invention.

FIG. 8 is a second sequence diagram illustrating interactions between the UE 20 and the NW 400/500/600 according to an embodiment of the present invention. The NW 400/500/600 may initiate a PDU session modification procedure 802 by sending a PDU Session Modification Command message to the UE 20. The ATSSS rules provided by the NW 400/500/600 are carried in the PDU Session Modification Command message. The UE 20 acknowledges the PDU Session Modification Command message, and sends a PDU Session Modification Complete message to the NW 400/500/600. In this embodiment, the NN parameters PR_NN provided by the UE 20 are carried in the PDU Session Modification Complete message. Alternatively, the UE 20 may initiate a new PDU session procedure 804 for sending the NN parameters PR_NN to the NW 400/500/600 via a new Message Request.

After receiving the NN parameters PR_NN, the NW 400/500/600 uses the NN parameters PR_A assisted by the UE 20 to perform machine-learning-based access performance prediction and machine-learning-based ATSSS rule selection (or uses the NN parameters PR_NN assisted by the UE 20 to perform machine-learning-based ATSSS rule selection), thereby generating the network-decided ATSSS policy PL_1. The NW 400/500/600 may initiate a PDU session modification procedure 806 by sending a PDU Session Modification Command message to the UE 20. The ATSSS rules provided by the NW 400/500/600 assisted by the UE-provided NN parameters PR_NN are carried in the PDU Session Modification Command message. Specifically, the PDU Session Modification Command message carries the network-decided ATSSS policy PL_1, including ATSSS rules for steering modes such as the Active-Standby mode, the Smallest Delay mode, the Load-Balancing mode, and the Priority-based mode. The UE 20 acknowledges the PDU Session Modification Command message, and sends a PDU Session Modification Complete message to the NW 400/500/600.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network (NW) comprising:
   a wireless communication circuit, arranged to receive parameters from a user equipment (UE) and transmit a network-decided access traffic steering, switching and splitting (ATSSS) policy to the UE, wherein the parameters do not include performance of a 3rd generation partnership project (3GPP) access and performance of a non-3GPP access; and
   an ATSSS policy decision circuit, arranged to perform ATSSS rule selection for generating the network-decided ATSSS policy, wherein the ATSSS rule selection is assisted by at least a portion of the parameters provided by the UE;
   wherein after the wireless communication circuit receives the parameters from the UE, the ATSSS policy decision circuit generates the network-decided ATSSS policy according to the ATSSS rule selection assisted by said at least a portion of the parameters, and the wireless communication circuit transmits the network-decided ATSSS policy generated by the ATSSS policy decision circuit to the UE.

2. The NW of claim 1, wherein the ATSSS policy decision circuit is arranged to generate the network-decided ATSSS policy through machine learning.

3. The NW of claim 2, wherein the parameters comprise neural-network (NN) parameters transmitted from the UE, and the ATSSS policy decision circuit uses an NN model indicated by the NN parameters to generate the network-decided ATSSS policy.

4. The NW of claim 1, further comprising:
   an access performance prediction circuit, arranged to perform access performance prediction to obtain predicted performance of the 3GPP access and predicted performance of the non-3GPP access that are referenced by the ATSSS rule selection;
   wherein the access performance prediction is assisted by at least a portion of the parameters provided by the UE.

5. The NW of claim 4, wherein the access performance prediction circuit is arranged to obtain the predicted performance of the 3GPP access and the predicted performance of the non-3GPP access through machine learning.

6. The NW of claim 5, wherein the parameters comprise neural-network (NN) parameters transmitted from the UE, and the access performance prediction circuit uses an NN model indicated by the NN parameters to obtain the predicted performance of the 3GPP access and the predicted performance of the non-3GPP access.

7. A network (NW) comprising:
   a wireless communication circuit, arranged to receive parameters from a user equipment (UE) and transmit a network-decided access traffic steering, switching and splitting (ATSSS) policy to the UE;
   an access performance prediction circuit, arranged to perform access performance prediction to obtain predicted performance of the 3GPP access and predicted performance of the non-3GPP access, wherein the access performance prediction is assisted by at least a portion of the parameters; and
   an ATSSS policy decision circuit, arranged to generate the network-decided ATSSS policy according to the predicted performance of the 3GPP access and the predicted performance of the non-3GPP access;
   wherein after the wireless communication circuit receives the parameters from the UE, the ATSSS policy decision circuit generates the network-decided ATSSS policy according to the predicted performance of the 3GPP access and the predicted performance of the non-3GPP access that are obtained by the access performance prediction assisted by said at least a portion of the parameters, and the wireless communication circuit transmits the network-decided ATSSS policy generated by the ATSSS policy decision circuit to the UE.

8. The NW of claim 7, wherein the access performance prediction circuit is arranged to obtain the predicted performance of the 3GPP access and the predicted performance of the non-3GPP access through machine learning.

9. The NW of claim 8, wherein the parameters comprise neural-network (NN) parameters transmitted from the UE, and the access performance prediction circuit uses an NN model indicated by the NN parameters to obtain the predicted performance of the 3GPP access and the predicted performance of the non-3GPP access.

10. A wireless communication method applicable to a network (NW), comprising:
    receiving parameters transmitted from a user equipment (UE), wherein the parameters do not include performance of a 3rd generation partnership project (3GPP) access and performance of a non-3GPP access;
    performing access traffic steering, switching and splitting (ATSSS) rule selection for generating a network-decided ATSSS policy, wherein the ATSSS rule selection is assisted by at least a portion of the parameters provided by the UE; and
    transmitting the network-decided ATSSS policy to the UE;
    wherein after the parameters are received from the UE, the network-decided ATSSS policy is generated by the ATSSS rule selection assisted by said at least a portion of the parameters, and the network-decided ATSSS policy is transmitted to the UE.

11. The wireless communication method of claim 10, wherein the ATSSS rule selection generates the network-decided ATSSS policy through machine learning.

12. The wireless communication method of claim 11, wherein the parameters comprise neural-network (NN) parameters transmitted from the UE, and the ATSSS rule selection uses an NN model indicated by the NN parameters to generate the network-decided ATSSS policy.

13. The wireless communication method of claim 10, further comprising:
performing access performance prediction to obtain predicted performance of the 3GPP access and predicted performance of the non-3GPP access that are referenced by the ATSSS rule selection;
wherein the access performance prediction is assisted by at least a portion of the parameters provided by the UE.

14. The wireless communication method of claim 13, wherein the access performance prediction obtains the predicted performance of the 3GPP access and the predicted performance of the non-3GPP access through machine learning.

15. The wireless communication method of claim 14, wherein the parameters comprise neural-network (NN) parameters transmitted from the UE, and the access performance prediction uses an NN model indicated by the NN parameters to obtain the predicted performance of the 3GPP access and the predicted performance of the non-3GPP access.

16. A wireless communication method applicable to a network (NW), comprising:
receiving parameters transmitted from a user equipment (UE);
performing access performance prediction to obtain predicted performance of the 3GPP access and predicted performance of the non-3GPP access, wherein the access performance prediction is assisted by at least a portion of the parameters;
generating a network-decided access traffic steering, switching and splitting (ATSSS) policy according to the predicted performance of the 3GPP access and the predicted performance of the non-3GPP access; and
transmitting the network-decided ATSSS policy to the UE;
wherein after the parameters are received from the UE,
the network-decided ATSSS policy is generated according to the predicted performance of the 3GPP access and the predicted performance of the non-3GPP access that are obtained by the access performance prediction assisted by said at least a portion of the parameters, and
the network-decided ATSSS policy is transmitted to the UE.

17. The wireless communication method of claim 16, wherein the access performance prediction obtains the predicted performance of the 3GPP access and the predicted performance of the non-3GPP access through machine learning.

18. The wireless communication method of claim 17, wherein the parameters comprise neural-network (NN) parameters transmitted from the UE, and the access performance prediction uses an NN model indicated by the NN parameters to obtain the predicted performance of the 3GPP access and the predicted performance of the non-3GPP access.

* * * * *